(12) United States Patent
Zhai et al.

(10) Patent No.: US 12,660,749 B2
(45) Date of Patent: Jun. 23, 2026

(54) MOWING HEIGHT ADJUSTING DEVICE AND AUTOMATIC MOWER HAVING SAME

(71) Applicant: Willand (Beijing) Technology Co., LTD., Beijing (CN)

(72) Inventors: Dongyan Zhai, Beijing (CN); Junwei Cui, Beijing (CN); Bin Shen, Beijing (CN)

(73) Assignee: Willand (Beijing) Technology Co., LTD. (CN)

( * ) Notice: Subject to any disclaimer, the term of this patent is extended or adjusted under 35 U.S.C. 154(b) by 651 days.

(21) Appl. No.: 18/070,647

(22) Filed: Nov. 29, 2022

(65) Prior Publication Data

US 2023/0180648 A1      Jun. 15, 2023

(30) Foreign Application Priority Data

Dec. 15, 2021    (CN) .......................... 202111536813.9
Dec. 15, 2021    (CN) .......................... 202123160550.4

(51) Int. Cl.
*A01D 34/74*          (2006.01)
*A01D 69/02*          (2006.01)
*A01D 101/00*        (2006.01)

(52) U.S. Cl.
CPC ............. *A01D 34/74* (2013.01); *A01D 69/02* (2013.01); *A01D 2101/00* (2013.01)

(58) Field of Classification Search
CPC .... A01D 2101/00; A01D 69/02; A01D 34/00; A01D 34/001; A01D 34/006; A01D 34/008; A01D 34/54; A01D 34/78; A01D 34/74
See application file for complete search history.

(56) References Cited

U.S. PATENT DOCUMENTS

| | | | |
|---|---|---|---|
| 7,707,812 B2 * | 5/2010 | Cheung .................. | A01D 34/78 |
| | | | 56/15.8 |
| 8,234,848 B2 * | 8/2012 | Messina .............. | A01D 34/008 |
| | | | 56/17.1 |
| 9,357,699 B2 * | 6/2016 | Elonsson ................ | F16H 25/24 |
| 10,104,837 B2 * | 10/2018 | Hashimoto ............ | A01D 34/74 |

(Continued)

FOREIGN PATENT DOCUMENTS

| | | |
|---|---|---|
| CN | 206274765 U | 6/2017 |
| CN | 109496531 A | 3/2019 |

(Continued)

*Primary Examiner* — Adam J Behrens

(74) *Attorney, Agent, or Firm* — Emerson, Thomson & Benentt, LLC; Roger D. Emerson; Peter R. Detorre

(57)          ABSTRACT

A mowing height adjusting device and an automatic mower having the same are provided. The mowing height adjusting device comprises a mowing component and a lifting mechanism, wherein the lifting mechanism comprises a first housing and a first motor, the first housing is directly connected with the mowing component, the first housing is configured to surround and form a first accommodating cavity, the first motor is accommodated in the first accommodating cavity, the first motor is configured to drive the first housing to rotate around a first axis to drive the mowing component to move in a first direction, and the extension direction of the first axis is parallel to the first direction. The device is small in volume and compact in structure.

14 Claims, 5 Drawing Sheets

(56)                References Cited

U.S. PATENT DOCUMENTS

| | | | | |
|---|---|---|---|---|
| 11,696,526 | B2 * | 7/2023 | Curtis | A01D 34/74 |
| | | | | 56/10.2 A |
| 11,793,110 | B2 * | 10/2023 | Watanabe | A01D 34/74 |
| 11,812,691 | B2 * | 11/2023 | Roberts | A01D 34/64 |
| 12,058,957 | B2 * | 8/2024 | Pu | A01D 34/008 |
| 12,082,527 | B2 * | 9/2024 | Ma | A01D 34/008 |
| 12,102,036 | B2 * | 10/2024 | Hagiwara | A01D 34/008 |
| 12,144,283 | B2 * | 11/2024 | Xu | A01D 69/02 |
| 12,232,443 | B2 * | 2/2025 | Johansson | F16H 25/2006 |
| 2009/0183482 | A1 * | 7/2009 | Cheung | A01D 34/824 |
| | | | | 56/17.1 |
| 2017/0181375 | A1 * | 6/2017 | Hashimoto | A01D 34/74 |
| 2017/0280623 | A1 * | 10/2017 | Yamamura | A01D 34/008 |
| 2018/0271014 | A1 * | 9/2018 | Matsuzawa | A01D 34/826 |
| 2019/0307065 | A1 | 10/2019 | Hong et al. | |
| 2020/0170186 | A1 * | 6/2020 | Curtis | F16H 25/20 |
| 2021/0037706 | A1 * | 2/2021 | Watanabe | A01D 34/74 |
| 2022/0132733 | A1 * | 5/2022 | Hagiwara | A01D 34/008 |
| | | | | 56/10.2 R |
| 2022/0192090 | A1 * | 6/2022 | Roberts | A01D 34/008 |
| 2022/0369546 | A1 * | 11/2022 | Docken | A01D 34/74 |
| 2022/0408651 | A1 * | 12/2022 | Yamazaki | A01D 34/81 |
| 2023/0051150 | A1 * | 2/2023 | Pu | A01D 34/008 |
| 2023/0320269 | A1 * | 10/2023 | Curtis | A01D 34/64 |
| | | | | 56/10.2 A |
| 2024/0268263 | A1 * | 8/2024 | Cao | A01D 34/008 |
| 2024/0397859 | A1 * | 12/2024 | Ma | A01D 34/64 |

FOREIGN PATENT DOCUMENTS

| | | | | |
|---|---|---|---|---|
| CN | 110933986 | A | 3/2020 | |
| CN | 112970415 | A | 6/2021 | |
| CN | 214338688 | U | 10/2021 | |
| CN | 216532643 | U | 5/2022 | |
| DE | 102019220321 | A1 | 6/2021 | |
| EP | 2412220 | A1 | 2/2012 | |
| EP | 3395149 | A1 | 10/2018 | |
| EP | 3395149 | B1 | 12/2019 | |
| EP | 3834598 | A1 * | 6/2021 | A01D 34/008 |
| WO | WO2011026419 | A1 | 3/2011 | |
| WO | WO2014007694 | A1 | 1/2014 | |
| WO | 2021091972 | A1 | 5/2021 | |

* cited by examiner

MOWING HEIGHT ADJUSTING DEVICE AND AUTOMATIC MOWER HAVING SAME

CROSS-REFERENCE TO RELATED APPLICATION

The present disclosure claims priority to Chinese Application No. 202111536813.9 filed on Dec. 15, 2021, and Chinese Application No. 202123160550.4 filed on Dec. 15, 2021, and entitled "Mowing Height Adjusting Device and Automatic Mower Thereof", all of which are incorporated herein by reference in their entirety.

TECHNICAL FIELD

The embodiment of the present disclosure relates to the technical field of gardening equipment, in particular to a mowing height adjusting device and an automatic mower having the same.

BACKGROUND

The existing self-moving gardening equipment (which can also be referred to as self-service gardening equipment or intelligent gardening equipment or automatic gardening equipment, etc.), such as an automatic mower, can automatically mow grass without being attended or controlled, thus reducing the occupation of time of the user and reducing the repetitive labor of the user.

The existing automatic mower comprises a cutter head motor and a mowing cutter head. In addition, in order to facilitate the user to adjust the mowing height, the automatic mower can further comprise an electric adjusting component. The electric adjusting component is connected with the cutter head motor and drives the cutter head motor to move in the vertical direction, so as to adjust the height of the mowing cutter head to realize adjustment of the mowing height.

The electric adjusting component of the existing automatic mower usually comprises a nut, a screw, a transmission mechanism, a lifting motor, etc. The lifting motor and the screw are placed side by side and are driven by the transmission mechanism. The screw is engaged with the nut, and the nut is connected with the cutter head motor such that the rotation of the screw drives the nut and the cutter head motor to move.

The automatic mower with this structure has the following problems: the electric adjusting component occupies a large space, which results in a large overall structure of the automatic mower, and a number of parts in the electric adjusting component is large, which results in reduced reliability and increased cost.

SUMMARY

In view of the above problems, an embodiment of the present disclosure is put forward, which provides a mowing height adjusting device and an automatic mower having the same, in order to at least solve the problems of large volume and high cost of the existing automatic mower.

One or more embodiments of the present disclosure provide a mowing height adjusting device, which comprises a mowing component and a lifting mechanism, wherein the lifting mechanism comprises a first housing and a first motor, the first housing is directly connected with the mowing component, the first housing is configured to surround and form a first accommodating cavity, the first motor is accommodated in the first accommodating cavity, the first motor is configured to drive the first housing to rotate around a first axis to drive the mowing component to move in a first direction, and the extension direction of the first axis is parallel to the first direction.

Preferably, the mowing component comprises a second motor and a mowing blade, the second motor is directly connected with the first housing and is driven by the first housing to move in the first direction, and the mowing blade is connected with the second motor and is configured to move with the second motor.

Preferably, the second motor is provided with a convex structure, and the convex structure is in threaded engagement with the first housing.

Preferably, a screw thread extending along the first axis is provided on the peripheral surface of the first housing, and the convex structure is a toothed structure which is engageable with the screw thread.

Preferably, an output shaft of the first motor is coaxial with the first axis around which the first housing rotates.

Preferably, the first motor is an inner rotor motor, the first motor comprises a motor housing, the motor housing is located in the first housing, and an output shaft of the first motor is connected with the first housing.

Preferably, the mowing height adjusting device further comprises a base, the base comprises a main body and a frame, the frame comprises a first mounting part and a second mounting part, the first mounting part is detachably connected with the main body through fasteners, at least part of the second mounting part is configured to extend into the first housing, and the motor housing is fixedly provided in the second mounting part.

Preferably, the second mounting part is a cylinder, the first mounting part is provided with a through hole, the through hole is communicated with an inner cavity of the cylinder, and the first motor is adapted to fit into the cylinder or removable from the cylinder through the through hole.

Preferably, a bearing is provided between the first housing and the main body, so that the first housing is rotatable with respect to the main body and prevents the first housing from moving in the extending direction of the first axis.

Preferably, the first motor is an outer rotor motor, the outer rotor motor comprises a rotor and a motor housing, the motor housing is provided outside the rotor, and the motor housing is provided with a screw thread to serve as the first housing.

Preferably, the mowing height adjusting device further comprises a base, the base comprises a main body, a first concave space and a second concave space are provided on the main body, at least part of the mowing component is provided in the first concave space, and at least part of the lifting mechanism is provided in the second concave space.

Preferably, the first concave space of the main body is further provided with a guide structure, the guide structure is slidably connected with the mowing component, and the guide structure is configured to guide the mowing component to move in the first direction.

Preferably, the guide structure comprises a first guide member and a second guide member detachably connected to the base, and the first guide member and the second guide member are provided at an interval and form a guide slideway through which the second motor of the mowing component moves.

Preferably, the mowing height adjusting device further comprises a position detector provided on the base, and the position detector is configured to detect the position of the second motor to determine the mowing height.

Preferably, the position detector comprises a sensor and a magnet, the magnet is provided on the second motor and is configured to move with the second motor, and the sensor is provided on the base and is configured to detect the magnet to determine the position of the second motor.

According to another aspect of the present disclosure, there is provided an automatic mower, wherein the automatic mower comprises a mowing component and a lifting mechanism, the lifting mechanism comprises a first housing and a first motor, the first housing is directly connected with the mowing component, the first housing is configured to surrounds and forms a first accommodating cavity, the first motor is accommodated in the first accommodating cavity, the first motor is configured to drive the first housing to rotate around a first axis to drive the mowing component to move in a first direction, and an extension direction of the first axis is parallel to the first direction.

Preferably, the mowing component comprises a second motor and a mowing blade, the second motor is directly connected with the first housing and is driven by the first housing to move in the first direction, and the mowing blade is connected with the second motor and is configured to move with the second motor.

Preferably, the second motor is provided with a convex structure, and the convex structure is in threaded engagement with the first housing.

Preferably, the first motor is an inner rotor motor, the first motor comprises a motor housing, the motor housing is located in the first housing, and an output shaft of the first motor is connected with the first housing.

Preferably, the first motor is an outer rotor motor, the outer rotor motor comprises a rotor and a motor housing, the motor housing is provided outside the rotor, and the motor housing is provided with a screw thread to serve as the first housing.

Through this embodiment, the mowing component is used to realize the mowing function. In order to meet the requirements of different mowing heights, the mowing component can move with respect to the lifting mechanism. The lifting mechanism is used to drive the mowing component to move to adjust its height. The first housing of the lifting mechanism is directly connected with the mowing component. The first motor is used to drive the first housing to rotate around the first axis, so that the first housing drives the mowing component to move in the first direction to adjust its height. The first motor is accommodated in the first accommodating cavity of the first housing, so that the first motor can conveniently drive the first housing to rotate without excessive transmission mechanism in the middle, thus reducing the number of parts, reducing the cost and improving the reliability. In addition, the space occupation is also reduced, thus further reducing the volume of the height adjusting device and making the structure of the height adjusting device more compact.

BRIEF DESCRIPTION OF THE DRAWINGS

In order to explain the embodiments of the present disclosure or the technical schemes in the prior art more clearly, the drawings that need to be used in the description of the embodiments or the prior art will be briefly introduced hereinafter. Obviously, the drawings in the following description are only some embodiments of the present disclosure. For those skilled in the art, other drawings can be obtained according to these drawings without any creative labor.

Figure 1:
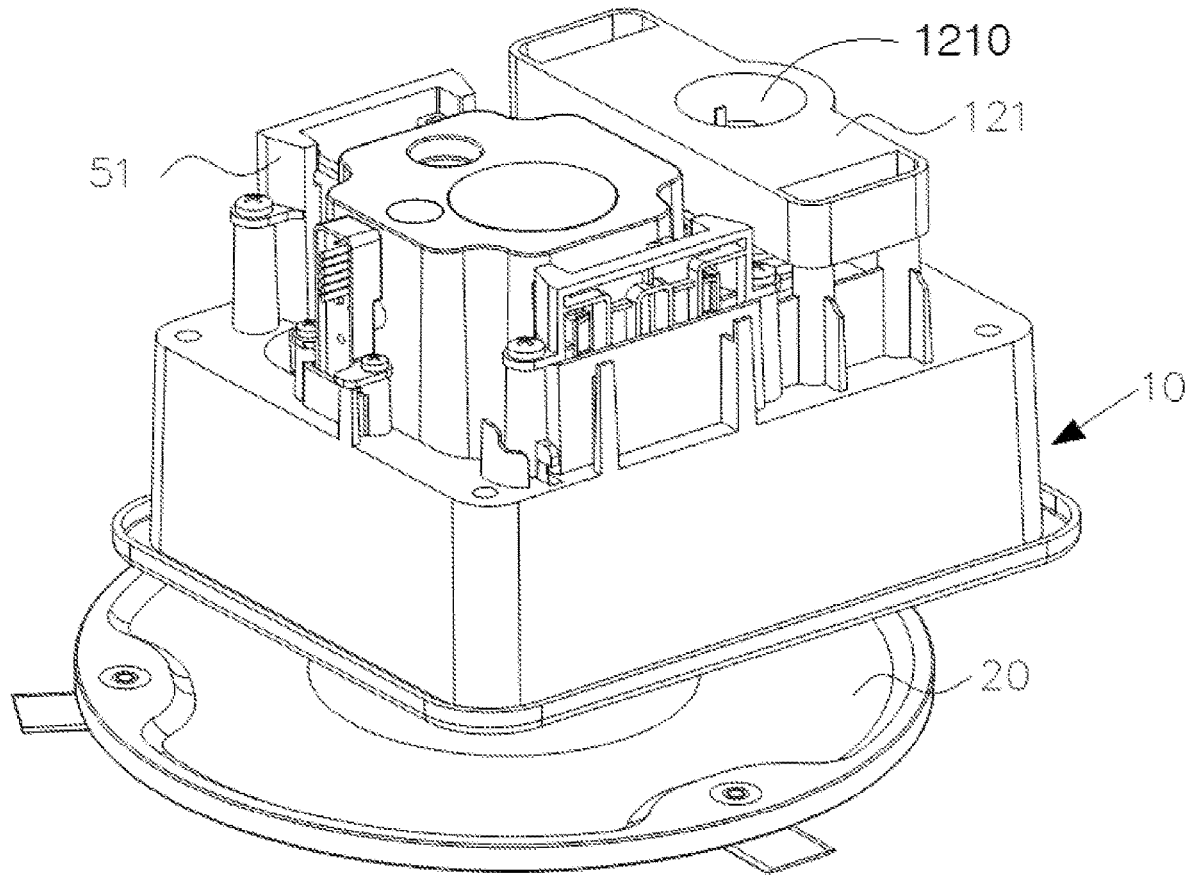
FIG. 1 is a schematic diagram of a three-dimensional structure of a mowing height adjusting device according to an embodiment of the present disclosure.

DESCRIPTION OF REFERENCE NUMERALS 10. base; 11. Main body; 12. Frame; 121. First mounting part; 1210. Through hole; 122. Second mounting part; 20. Mowing blade; 30. Second motor; 31. Convex structure; 32. Protective housing; 41. First housing; 42. First motor; 421. Output shaft; 51. First guide member; 511. Strip-shaped protrusion; 52. Second guide member; 61. Sensor; 62. Magnet; 70. Bearing; 80. Fastener

DETAILED DESCRIPTION OF THE EMBODIMENTS

In order to make those skilled in the art better understand the scheme of the present disclosure, the technical scheme in the embodiment of the present disclosure will be clearly and completely described below with reference to the drawings in the embodiment of the present disclosure. Obviously, the described embodiments are part of the embodiments of the present disclosure, rather than all of the embodiments. Based on the embodiment of the present disclosure, all other embodiments obtained by those skilled in the art without any creative labor fall within the scope of protection of the present disclosure.

As shown in FIG. 1 to FIG. 5, the embodiment of the present disclosure provides a mowing height adjusting device, which comprises a mowing component and a lifting mechanism. The lifting mechanism comprises a first housing 41 and a first motor 42. The first housing 41 is directly connected with the mowing component. The first housing 41 surrounds and forms a first accommodating cavity. The first motor 42 is accommodated in the first accommodating cavity. The first motor 42 drives the first housing 41 to rotate around a first axis to drive the mowing component to move in a first direction. The extension direction of the first axis is parallel to the first direction.

The mowing component is used to realize the mowing function. In order to meet the requirements of different mowing heights, the mowing component can move with respect to the lifting mechanism. The lifting mechanism is used to drive the mowing component to move to adjust its height. The first housing 41 of the lifting mechanism is directly connected with the mowing component. The first motor 42 is used to drive the first housing 41 to rotate around the first axis, so that the first housing 41 drives the mowing component to move in the first direction to adjust its height.

The first motor 42 is accommodated in the first accommodating cavity of the first housing 41, so that the first motor 42 can conveniently drive the first housing 41 to rotate without excessive transmission mechanism in the middle, thus reducing the number of parts, reducing the cost and improving the reliability. In addition, the space occupation is also reduced, thus further reducing the volume and making the structure of the height adjusting device more compact.

The structure of the mowing height adjusting device is explained as follows with reference to the attached drawings.

Figure 3:
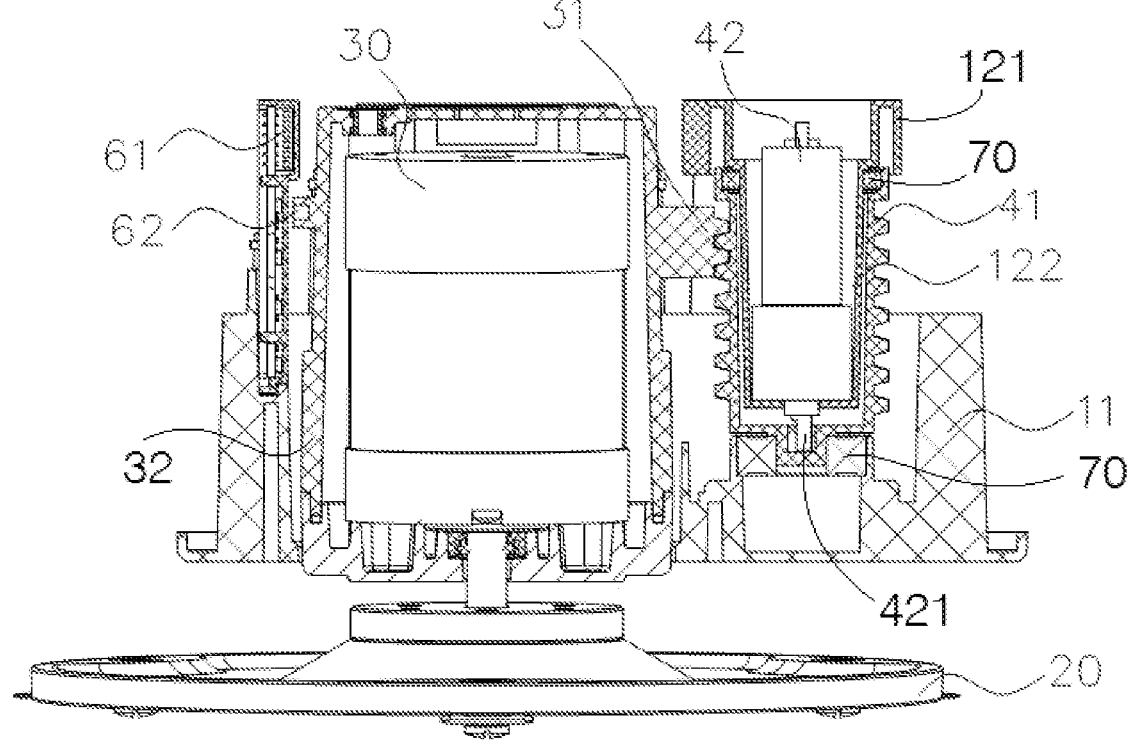
FIG. 3 is a schematic cross-sectional structural diagram of a mowing height adjusting device according to an embodiment of the present disclosure.

In this embodiment, the mowing component comprises a second motor 30 and a mowing blade 20. The second motor 30 (also referred to as a cutter head motor) is directly connected with the first housing 41 and is driven by the first housing 41 to move in the first direction. The mowing blade 20 is connected with the second motor 30 and moves with the second motor 30. In this way, when mowing is required, the second motor 30 drives the mowing blade 20 to rotate, thereby cutting grass. When the mowing height needs to be adjusted, the first motor 42 drives the first housing 41 to rotate, which then drives the second motor 30 and the mowing blade 20 to move in the first direction (up and down as shown in FIG. 3).

Preferably, in order to realize reliable transmission between the first housing 41 and the second motor 30, a screw thread is provided outside the first housing 41. The second motor 30 is provided with a convex structure 31, and the convex structure 31 is in threaded engagement with the first housing 41. The use of threaded engagement for transmission not only ensures the reliability of transmission, but also has high transmission efficiency, which is convenient to control the transmission ratio, so as to control the accuracy of height adjustment of the mowing component.

In an example, the convex structure 31 may be toothed. As shown in FIG. 3, the toothed convex structure 31 is provided on one side of the second motor 30, which can ensure that the second motor 30 is engaged with the first housing 41, thus ensuring reliable transmission and simplifying the structure of the second motor 30. Compared with the connection structure such as a screw thread, the toothed convex structure 31 between the first housing 41 and the second motor 30 has the advantage that it is easier to manufacture the mold and the processing cost is lower.

There are many ways in which the convex structure 31 is provided on the second motor 30.

In one example, the second motor 30 comprises a motor main body and a self-housing (i.e., the housing provided outside the motor main body when the second motor 30 leaves the factory). The motor main body is fixedly provided in the self-housing. The convex structure 31 is provided on the outer surface of the self-housing.

In another example, as shown in FIG. 3, in order to facilitate processing, the second motor 30 comprises a protective housing 32 (which can also be referred to as a second housing), a motor main body and a self-housing. The motor main body is fixedly provided in the self-housing. The protective housing 32 is additionally provided outside the self-housing of the second motor 30. The convex structure 31 is integrally formed on the protective housing 32, thus facilitating the processing of the convex structure 31. The output shaft of the motor main body of the second motor 30 passes through the protective housing 32 and is connected with the mowing blade 20.

Figure 2:
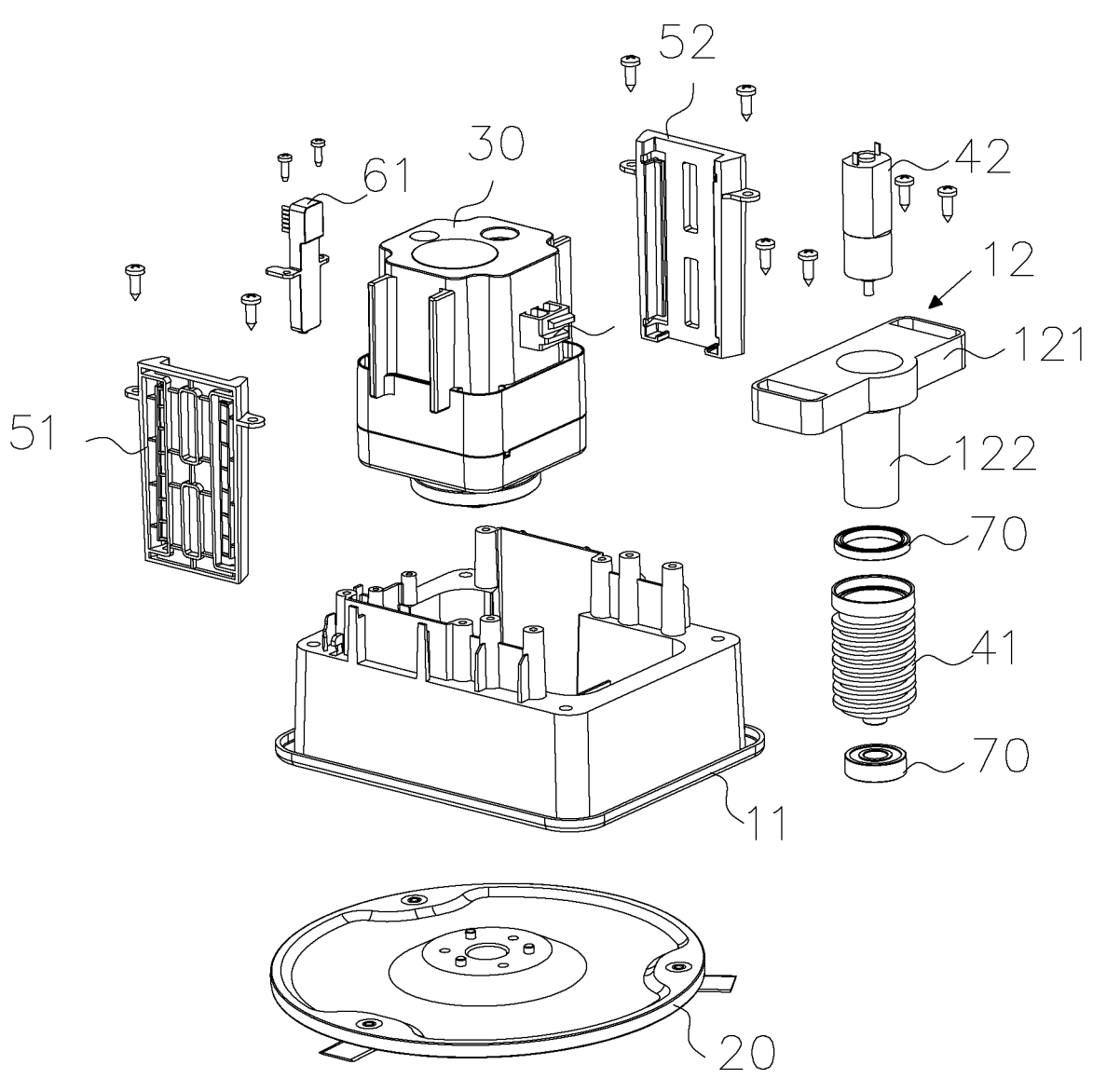
FIG. 2 is an exploded schematic diagram of a three-dimensional structure of a mowing height adjusting device according to an embodiment of the present disclosure.

As shown in FIGS. 1 and 2, the first housing 41 may be a threaded transmission housing, the peripheral surface of which is provided with a screw thread extending along the first axis to cooperate with the convex structure 31. Of course, in other embodiments, the first housing 41 may be a housing with any other suitable structure, which is not limited herein.

In this embodiment, the first motor 42 is provided in the first housing 41, and the output shaft 421 of the first motor 42 is coaxial with the first axis around which the first housing 41 rotates. In this way, the transmission between the output shaft 421 and the first housing 41 is more direct and simpler, thus reducing the space occupation and weight.

Preferably, in order to be able to reliably carry the mowing component and the lifting mechanism, as shown in FIGS. 1 and 2, the device comprises a base 10. The base 10 comprises a main body 11 and a frame 12. The frame 12 is detachably connected with the main body 11, and the frame 12 is configured to carry the lifting mechanism.

In a feasible way, in order to reduce the processing cost, the first motor 42 is an inner rotor motor. The first motor 42 comprises a motor housing. The motor housing is located in the first housing 41, and the output shaft 421 is connected with the first housing 41.

The inner rotor motor comprises a stator, a rotor, a motor housing, etc., wherein the stator is fixed in the motor housing, and the rotor is provided in the stator and is rotatable with respect to the stator. The output shaft 421 of the first motor 42 is connected with the rotor and is driven by the rotor to rotate. The first motor 42 of this structure is fixed and positioned by the motor housing.

Figure 4:
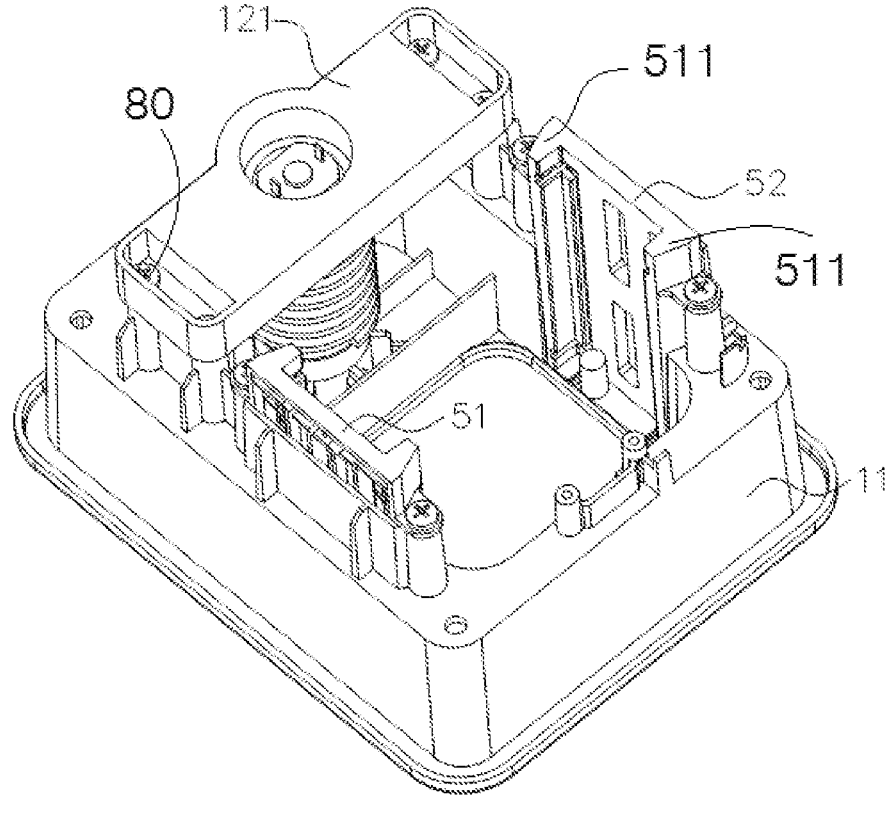
FIG. 4 is a schematic diagram of a three-dimensional structure of a mowing height adjusting device according to the embodiment of the present disclosure, in which a second motor is removed.
Figure 5:
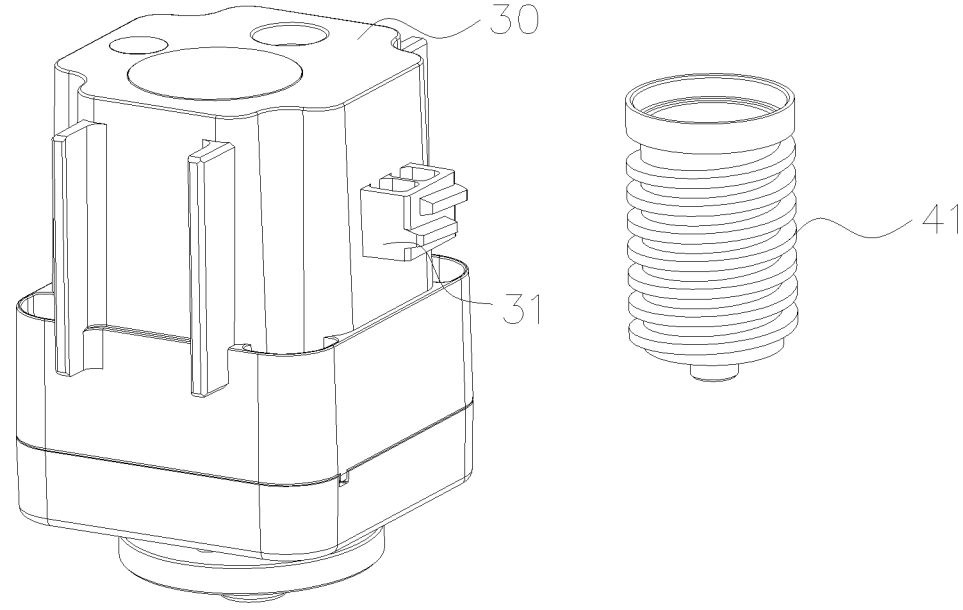
FIG. 5 is schematic diagram of a three-dimensional structure of a second motor and a threaded transmission part of a mowing height adjusting device according to the embodiment of the present disclosure.

In order to reliably fix the first motor 42 in the first housing 41, as shown in FIGS. 2 to 4, the frame 12 comprises a first mounting part 121 and a second mounting part 122. The first mounting part 121 is detachably connected with the main body 11 through fasteners 80. At least part of the second mounting part 122 extends into the first housing 41. The motor housing is fixedly provided in the second mounting part 122.

The shapes, materials, etc. of the first mounting part 121 and the second mounting part 122 can be determined as required, as long as they can be reliably mounted to the main body 11 and can accommodate and mount the first motor 42.

In an example, as shown in FIG. 4, the first mounting part 121 may be a rectangular block, which may be detachably connected with the main body 11 through fasteners 80 such as screws or bolts. For example, the first mounting part 121 is provided with an oblong hole through which a screw passes. The fastener 80 passes through the oblong hole and is fixedly connected with the main body 11. The oblong hole can conveniently adjust the position of the first mounting part 121 with respect to the main body 11, thus facilitating the coincidence and alignment of the output shaft 421 of the first motor 42 and the rotation axis of the first housing 41.

The second mounting part 122 is integrally formed with the first mounting part 121. The second mounting part 122 can be a cylinder (such as a round cylinder or a prismatic cylinder, etc.). The first mounting part 121 is provided with a through hole 1210. The through hole 1210 is communicated with the inner cavity of the cylinder, so that the first motor 42 can be placed into the cylinder or removed from the cylinder.

Preferably, the second mounting part 122 can be a cone cylinder, so that the cross-sectional area of the lower part of the cone cylinder can be adapted to the first motor 42. The opening of the upper part of the cone cylinder can be larger, thus facilitating taking out and placing of the first motor 42. The first motor 42 can be better positioned to facilitate the cooperation of the output shaft 421 of the first motor 42 with the first housing 41. Since the first motor 42 is provided in the second mounting part 122, the dustproof and waterproof effects can be realized more conveniently.

As shown in FIGS. 2 and 3, the first housing 41 is rotatably provided on the base 10. A bearing is provided between the first housing 41 and the main body 11, so that the first housing 41 is rotatable with respect to the main body 11 and prevents the first housing 41 from moving in the extension direction of the first axis.

For example, a bearing 70 (i.e., the bearing 70 located at the upper part in FIG. 3) is provided in the first housing 41, and the bearing 70 is provided between the second mounting part 122 and the first housing 41, thereby enabling the first housing 41 to rotate with respect to the second mounting part 122. A bearing 70 (i.e., the bearing 70 located at the lower part in FIG. 3) is also provided between the first housing 41 and the main body 11. On the one hand, the bearing 70 can support the first housing 41, and on the other hand, enables the first housing 41 to rotate with respect to the main body 11 without axial displacement.

The first motor 42 is embedded in the first housing 41 and is carried by the second mounting part 122. The output shaft 421 of the first motor 42 passes through the bottom wall of the second mounting part 122 and extends into the first housing 41 to be fixedly connected therewith, thereby driving the first housing 41 to rotate.

The output shaft 421 may have a D-shaped shaft with a D-shaped cross-section, or the output shaft 421 may be provided with a keyway. The output shaft 421 and the first housing 41 are driven by a connecting key.

In another possible way, the first motor 42 is an outer rotor motor. A motor housing is provided outside the rotor. The motor housing is provided with a screw thread as the first housing 41. The first motor 42 can integrate the motor housing with the first housing 41, so as to reduce the number of parts, thereby reducing the cost and volume.

In an example, a screw thread can be processed on the motor housing as the first housing 41. In this way, during rotation, the rotor drives the motor housing to rotate, so that the screw thread thereon rotates. In another example, the motor housing and the first housing 41 (such as a screw) can be fixed together. Of course, other ways can be used to integrate the motor housing and the first housing, which is not limited herein.

Preferably, in order to ensure that the lifting mechanism and the mowing component are stably and reliably carried, the main body 11 of the base 10 is provided with a first concave space and a second concave space. At least part of the mowing component is provided in the first concave space, and at least part of the lifting mechanism is provided in the second concave space.

Preferably, the first concave space of the main body 11 is further provided with a guide structure. The guide structure is slidably connected with the mowing component. The guide structure is configured to guide the mowing component to move in the first direction.

For example, the guide structure is provided outside the second motor 30 and guides the second motor 30. In this way, the guide structure can guide the second motor 30 to move, and has a certain function of supporting and stabilizing the second motor 30, thus preventing the second motor 30 from shaking.

As shown in FIGS. 2 and 4, the guide structure comprises a first guide member 51 and a second guide member 52 detachably connected to the base 10. The first guide member 51 and the second guide member 52 are provided at intervals and form a guide slideway through which the second motor 30 moves.

The structures of the first guide 51 and the second guide 52 may be the same or different. In order to reduce the cost, in this embodiment, both structures are the same. As shown in FIG. 4, the first guide member 51 is a plate body, both sides of which are provided with elongated strip-shaped protrusions 511. A slideway is formed between the two strip-shaped protrusions 511 to accommodate the second motor 30. The slideway can guide the second motor 30 to move and prevent the second motor 30 from shaking.

Preferably, in order to be able to detect the position of the second motor 30, so as to accurately grasp the mowing height, the mowing height adjusting device further comprises a position detector provided on the base 10. The position detector is configured to detect the position of the second motor 30 to determine the mowing height.

The position detector may have any suitable structure. For example, the position detector comprises a sensor 61 and a magnet 62. The magnet 62 is provided on the second motor 30 and moves with the second motor 30. The sensor 61 is provided on the base 10 and detects the magnet 62 to determine the position of the second motor 30. The sensor 61 is fixed on the base 10. As the sensor needs not to move with respect to the base 10, electric signals can be transmitted in a wired way, thus ensuring the reliability of data transmission and reducing the cost without configuring additional wireless transceiver modules.

As the magnet 62 moves with the second motor 30, the position of the magnet 62 with respect to the sensor 61 changes, resulting in a change in the magnetic field detected by the sensor 61. The sensor 61 can convert this change in the magnetic field into an electrical signal and output the electrical signal, so that the position of the second motor 30 with respect to the sensor 61 can be determined, the heights of the second motor 30 and the mowing component can be determined, and the mowing height can be accurately adjusted.

Of course, in another implementation, the set position of the position detector can be appropriately adjusted as required, such as the position detector is set at the position of the base 10 corresponding to the mowing component to directly detect the position of the mowing component. Alternatively, the position detector can be matched with the first motor 42, such as a magnetic encoder or a grating encoder provided on the first motor 42. The lifting height of the mowing component can be determined by detecting the rotation number of the first motor 42, so as to determine the mowing height.

The process of adjusting the mowing height is explained as follows.

The motor housing of the first motor 42 is fixed on the second mounting part 122. The end of the output shaft 421 of the first motor 42 is a D-shaped shaft. The first housing 41 is provided with a corresponding D-shaped hole. The output shaft 421 of the first motor 42 is provided in the D-shaped hole, so that the first motor 42 can drive the first housing 41 to rotate.

As the frame 12 is fixedly connected with the main body 11, both ends of the first housing 41 are limited by the frame 12 and the main body 11, respectively, and bearings 70 are mounted between the first housing 41 and the frame 12 and the main body 11. Therefore, the first housing 41 can only rotate around its own rotation axis (i.e., the first axis).

As the convex structure 31 on the side of the second motor 30 is engaged with the screw thread on the first housing 41, when the screw thread on the first housing 41 is a right-handed thread, the clockwise rotation of the first housing 41 drives the second motor 30 and the mowing component to ascend when viewed from above. The counterclockwise rotation of the first housing 41 drives the second motor 30 and the mowing component to descend.

When the screw thread on the first housing 41 is a left-handed thread, the lifting direction and the rotating direction are opposite to the aforementioned process, which will not be described in detail herein.

When the second motor 30 moves, the sensor 61 detects the position of the magnet 62 to determine the mowing height, and then the adjustment of mowing height can be accurately controlled. In addition, the second motor 30 is limited in the guide slideway by the guide structure, which can only slide in the direction of the guide slideway, thus avoiding driving the mowing blade to shift in the horizontal direction and ensuring the reliability of engagement between the convex structure 31 and the first housing 41.

According to another aspect of the present disclosure, there is provided an automatic mower, comprising the mowing height adjusting device described above. The automatic mower makes full use of the space inside the first housing 41. The first motor 42 directly drives the first housing 41 to rotate, which has the effect of saving space and reducing the complexity of the mechanism. In addition, the first motor 42 is provided inside the first housing 41, which can facilitate dustproof and waterproof operation, thus further reducing the production and design cost, and making the waterproof and dustproof effect better.

It should be noted that in the description of the present disclosure, the terms such as "first" and "second" are only used for convenience in describing different parts or names, and cannot be understood as indicating or implying the sequential relationship, relative importance or implicitly indicating the number of indicated technical features. Therefore, the features defined with "first" and "second" can include at least one of these features explicitly or implicitly.

Unless otherwise defined, all technical and scientific terms used herein have the same meanings as commonly understood by those skilled in the technical field of the present disclosure. The term used in this specification of the present disclosure is only for the purpose of describing specific embodiments, and is not intended to limit the present disclosure.

It should be noted that although the specific embodiments of the present disclosure have been described in detail with reference to the drawings, it should not be understood as limiting the scope of protection of the present disclosure. Within the scope described in the claims, various modifications and variations that can be made by those skilled in the art without creative labor still belong to the scope of protection of the present disclosure.

Examples of embodiments of the present disclosure are intended to concisely explain the technical features of the embodiments of the present disclosure, so that those skilled in the art can intuitively understand the technical features of the embodiments of the present disclosure, which will not be taken as improper limitation of the embodiments of the present disclosure.

Finally, it should be noted that the above embodiments are only used to illustrate the technical schemes of the present disclosure, rather than not limit the technical schemes. Although the present disclosure has been described in detail with reference to the foregoing embodiments, it should be understood by those skilled in the art that it is still possible to modify the technical schemes described in the foregoing embodiments, or to equivalently replace some technical features thereof. These modifications or substitutions do not make the essence of the corresponding technical schemes deviate from the spirit and scope of the technical schemes of various embodiments of the present disclosure.

What is claimed is:

1. A mowing height adjusting device, comprising a mowing component and a lifting mechanism, wherein the lifting mechanism comprises a first housing and a first motor, the first housing is directly connected with the mowing component, the first housing is configured to surround and form a first accommodating cavity, the first motor is accommodated in the first accommodating cavity, the first motor is configured to drive the first housing to rotate around a first axis to drive the mowing component to move in a first direction, and an extension direction of the first axis is parallel to the first direction, wherein the mowing height adjusting device further comprises a base, the base comprises a main body and a frame arranged above the main body, the frame is fixedly connected to the main body such that the frame and the main body restrict the first housing therebetween, the frame comprises a first mounting part and a second mounting part, the first mounting part is detachably connected with the main body through a fastener, at least part of the second mounting part is configured to extend into the first housing, and a motor housing of the first motor is fixedly provided in the second mounting part, and the first mounting part is provided with a through hole in communication with an inner cavity of the cylinder so that the first motor is placeable into the cylinder or removable from the cylinder.

2. The mowing height adjusting device according to claim 1, wherein the mowing component comprises a second motor and a mowing blade, the second motor is directly connected with the first housing and is driven by the first housing to move in the first direction, and the mowing blade is connected with the second motor and is configured to move with the second motor.

3. The mowing height adjusting device according to claim 2, wherein the second motor is provided with a convex structure, and the convex structure is in threaded engagement with the first housing.

4. The mowing height adjusting device according to claim 3, wherein a screw thread extending along the first axis is provided on the peripheral surface of the first housing, and the convex structure is a toothed structure which is engageable with the screw thread.

5. The mowing height adjusting device according to claim 1, wherein an output shaft of the first motor is coaxial with the first axis around which the first housing rotates.

6. The mowing height adjusting device according to claim 1, wherein a bearing is provided between the first housing and the main body, so that the first housing is rotatable with respect to the main body and prevents the first housing from moving in the extending direction of the first axis.

7. The mowing height adjusting device according to claim 1, a first concave space and a second concave space are provided on the main body, at least part of the mowing component is provided in the first concave space, and at least part of the lifting mechanism is provided in the second concave space.

8. The mowing height adjusting device according to claim 7, wherein the first concave space of the main body is further provided with a guide structure, the guide structure is slidably connected with the mowing component, and the guide structure is configured to guide the mowing component to move in the first direction.

9. The mowing height adjusting device according to claim 8, wherein the guide structure comprises a first guide member and a second guide member detachably connected to the base, and the first guide member and the second guide member are provided at an interval and form a guide slideway through which the second motor of the mowing component moves.

10. The mowing height adjusting device according to claim 7, wherein the mowing height adjusting device further comprises a position detector provided on the base, and the position detector is configured to detect the position of the second motor to determine the mowing height.

11. The mowing height adjusting device according to claim 10, wherein the position detector comprises a sensor and a magnet, the magnet is provided on the second motor and is configured to move with the second motor, and the sensor is provided on the base and is configured to detect the magnet to determine the position of the second motor.

12. An automatic mower, wherein the automatic mower comprises a mowing component and a lifting mechanism, the lifting mechanism comprises a first housing and a first motor, the first housing is directly connected with the mowing component, the first housing is configured to surround and form a first accommodating cavity, the first motor is accommodated in the first accommodating cavity, the first motor is configured to drive the first housing to rotate around a first axis to drive the mowing component to move in a first direction, and an extension direction of the first axis is parallel to the first direction, wherein the automatic mower further comprises a base, the base comprises a main body and a frame arranged above the main body, the frame is fixedly connected to the main body such that the frame and the main body restrict the first housing therebetween, the frame comprises a first mounting part and a second mounting part, the first mounting part is detachably connected with the main body through a fastener, at least part of the second mounting part is configured to extend into the first housing, and a motor housing of the first motor is fixedly provided in the second mounting part, and the first mounting part is provided with a through hole in communication with an inner cavity of the cylinder so that the first motor is placeable into the cylinder or removable from the cylinder.

13. The automatic mower according to claim 12, wherein the mowing component comprises a second motor and a mowing blade, the second motor is directly connected with the first housing and is driven by the first housing to move in the first direction, and the mowing blade is connected with the second motor and is configured to move with the second motor.

14. The automatic mower according to claim 13, wherein the second motor is provided with a convex structure, and the convex structure is in threaded engagement with the first housing.

* * * * *